United States Patent [19]

Antoniw et al.

[11] 4,313,594
[45] Feb. 2, 1982

[54] VALVE ASSEMBLY AND METHOD

[75] Inventors: Walter W. Antoniw, Lakewood; Richard J. Silagy, Parma; James F. Norton, Berea, all of Ohio

[73] Assignee: Tuthill Corporation, Cleveland, Ohio

[21] Appl. No.: 122,859

[22] Filed: Feb. 20, 1980

[51] Int. Cl.³ .............................................. F16L 37/28
[52] U.S. Cl. ................................. 251/357; 137/614.02
[58] Field of Search ............................ 251/357, 149.6; 137/614.02

[56] References Cited

U.S. PATENT DOCUMENTS

| | | | |
|---|---|---|---|
| 1,002,938 | 9/1911 | Stange | 251/357 |
| 1,006,964 | 10/1911 | Lyons | 251/358 |
| 1,485,508 | 3/1924 | Kiley | 251/357 |
| 1,964,249 | 6/1934 | Chase | 251/357 |
| 2,103,503 | 12/1937 | White | 251/357 |
| 2,172,592 | 9/1939 | Podolsley | 251/357 |
| 2,516,927 | 8/1950 | Steirly | 251/357 |
| 2,771,091 | 11/1956 | Baker et al. | 251/357 |
| 2,823,048 | 2/1958 | Hansen | 251/149.6 |
| 3,085,783 | 4/1963 | Pulling | 251/357 |
| 3,144,237 | 8/1964 | Zurit et al. | 251/149.6 |
| 3,352,419 | 11/1967 | Entringer et al. | 251/357 |
| 3,460,801 | 8/1969 | Norton | 251/149.6 |
| 3,511,475 | 5/1970 | Pfau | 251/333 |
| 3,842,614 | 10/1974 | Karcher et al. | 137/614.04 |

Primary Examiner—A. Michael Chambers
Attorney, Agent, or Firm—Yount & Tarolli

[57] ABSTRACT

A new and improved valve assembly is easily assembled and includes a resilient annular washer. The washer has inner and outer side surfaces dimensioned so that a valve stem presses the inner side surface of the washer radially outwardly to expand the washer into engagement with a hook on a retainer cup. The hook holds the washer against axial displacement relative to the retainer cup under the influence of fluid pressure forces. The retainer cup advantageously engages a shoulder on the valve stem to limit axial compression of the washer.

14 Claims, 7 Drawing Figures

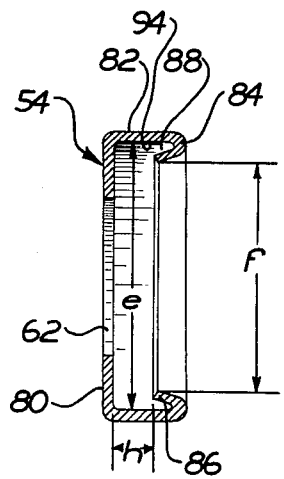
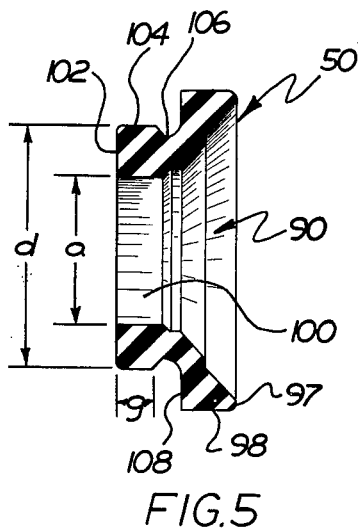
FIG.4  FIG.5
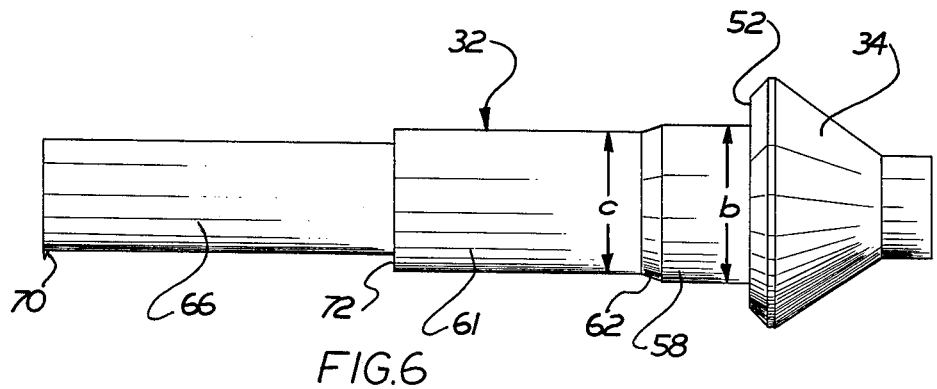
FIG.6
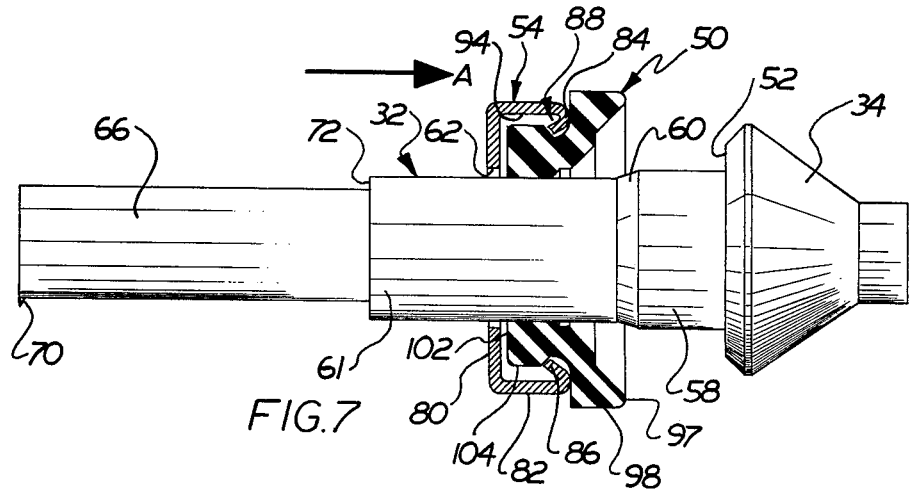
FIG.7

VALVE ASSEMBLY AND METHOD

BACKGROUND OF THE INVENTION

This invention relates to a valve and method by which it is assembled. More particularly, the invention relates to a valve which has a resiliently expandable washer which is held against displacement under the influence of fluid pressure by a retainer having a hook.

Various types of resilient washers for engaging a valve seat have been used. Some of these washers are held against axial movement by a retainer. A faucet valve in which a resilient washer is held by a retainer is disclosed in U.S. Pat. No. 2,172,592. In this patent, the washer is held by inwardly projecting prongs which engage the washer to hold it in place. Somewhat similar structures are shown in U.S. Pat. Nos. 1,006,964 and 3,511,475 in which washers are held by flanges. In addition, U.S. Pat. Nos. 3,144,237 and 1,485,508 disclose valve assemblies having washers which are compressed.

SUMMARY OF THE INVENTION

The present invention provides a new and improved valve which is easily assembled. The valve is advantageously used in a quick-disconnect coupling and includes a resilient washer which sealingly engages a valve seat. The washer is disposed in a retainer having a hook which engages the washer to positively hold it against axial movement.

When the valve is to be assembled, the resilient washer is placed in the retainer. The washer and retainer are then moved into telescopic engagement with the valve stem. As the washer and retainer are telescoped onto the valve stem, the valve stem expands the washer radially outward into engagement with the hook on the retainer. In order to prevent the application of excessive compression forces against the washer, the retainer abuttingly engages a shoulder on the valve stem to limit movement of the retainer and washer toward a head end portion of the valve stem against which the washer is compressed.

It is therefore an object of this invention to provide a new and improved valve and method of assembling same wherein a washer is pressed radially outward into engagement with a hook to hold the washer against axial movement when subjected to fluid pressure forces.

It is another object of the invention to provide a new and improved valve and method of assembling the same as set forth in the preceding object and wherein a valve stem cooperates with a retainer to limit axial movement of the washer and compression forces applied against the washer.

BRIEF DESCRIPTION OF THE DRAWINGS

The foregoing and other objects and features of the invention will become more apparent upon consideration of the accompanying drawings forming a part of this specification and in which:

FIG. 4 is a cross sectional view of the retainer used in the valve assembly of FIG. 2;

FIG. 5 is a cross sectional view of a resilient washer used in the valve assembly of FIG. 2;

FIG. 6 is a side elevational view of a valve stem used in the valve assembly of FIG. 2; and FIG. 7 is a side elevational view illustrating the process of assembly of the retainer, washer and valve stem of FIGS. 4, 5 and 6.

DESCRIPTION OF A SPECIFIC PREFERRED EMBODIMENT

Figure 1:
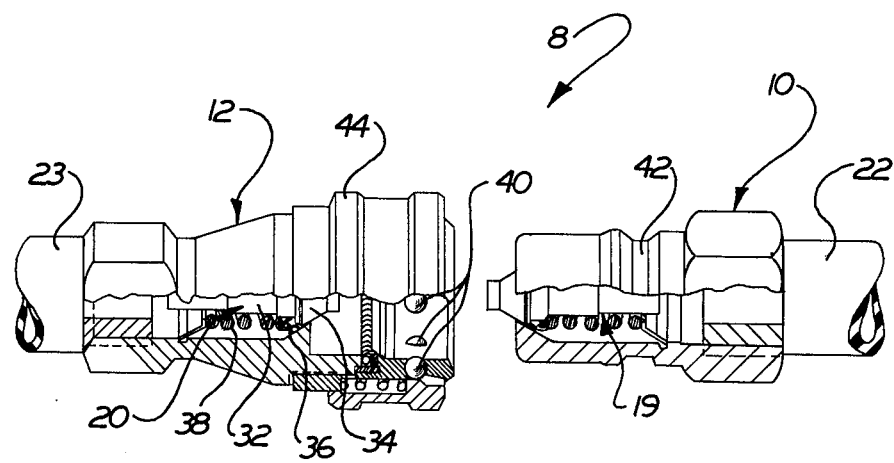
FIG. 1 is a fragmentary view of a quick disconnect coupling having a plug and socket with valve assemblies which are constructed and assembled in accordance with the present invention.

A quick-disconnect coupling 8 (FIG. 1) includes a plug 10 and a socket 12 in which valve assemblies 19 and 20 constructed in accordance with the present invention are used. The plug 10 is attached to an end of a fluid conduit or hose 22. The socket 12 is attached to a second conduit or hose 23. When the coupling 8 is in the disconnected condition of FIG. 1, the valve assemblies 19 and 20 block fluid flow through the plug 10 and socket 12. When the coupling 8 is in a connected condition in which the plug 10 is telescopically received in the socket 12, the valve assemblies 19 and 20 are opened to allow fluid to flow between the conduits 22 and 23.

The valve assembly 20 includes a cylindrical metal valve stem 32 having a generally frustoconical valve head 34 located on one end thereof. The valve head is urged into abutting engagement with a frustoconical valve seat 36 by a coil spring 38 which acts against the base of the valve head 34. Plug and socket quick-disconnect coupling assemblies of this type are disclosed in U.S. Pat. Nos. 2,823,048; 3,144,237; and 3,842,614.

As is well known in the art, the connection of plug 10 and socket 12 (FIG. 1) includes the steps of aligning the plug 10 with the end opening of the socket 12 and inserting the plug 10 into the socket 12. As the plug 10 passes inwardly into the socket 12, coupling balls 40 move into locking engagement with groove 42 in the plug body. The balls 40 are held in place by a locking sleeve 44 located on the socket 12.

Also, as the plug 10 moves into the socket 12, the valve assemblies 19 and 20 come into abutting engagement. Continued movement results in the valve assemblies 19 and 20 being operated from the closed condition of FIG. 1 to the open condition. As this occurs, the valve stems are moved axially within their respective coupling members against the action of associated springs. This axial movement opens the fluid passage within both the plug 10 and socket 12 by moving the valve heads away from the respective valve seats.

Figure 2:
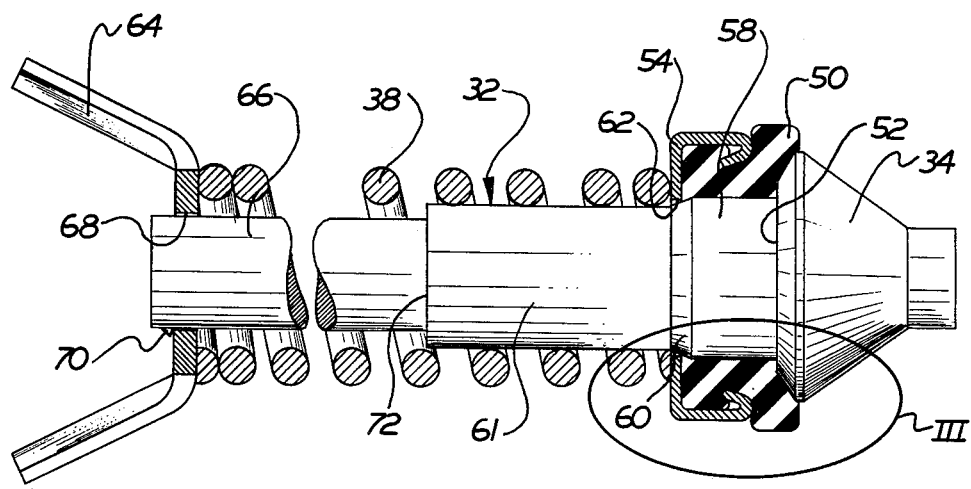
FIG. 2 is an enlarged side elevational view of washer, retainer and valve stem portion of a valve assembly constructed and assembled in accordance with the present invention and used in the plug and socket of FIG. 1.

Since the valve assemblies 19 and 20 of both the plug 10 and the socket 12 are essentially identical, only one of such valve assemblies will be described in greater detail with reference to the remaining Figures. The valve assembly 20 (FIG. 2) includes a resilient annular washer 50 which sealingly engages the valve seat 36 when the valve assembly 20 is in the closed condition of FIG. 1. The washer 50 (FIG. 2) is located axially behind the valve head 34 and abuts against a circular base 52 of the valve head. The washer 50 is retained within a metal cup-shaped washer retainer 54 and is urged into abutting engagement with the base 52 of the valve head 34 by the action of spring 38 against the bottom of the cup-shaped retainer 54.

The valve stem 32 is formed with an enlarged diameter cylindrical end portion 58 located adjacent the base 52 of the valve head 34. An annular shoulder 60 extends between the cylindrical end portion 58 and a smaller diameter cylindrical body portion 61 of the valve stem 32. The cup-shaped washer retainer 54 has a circular central opening 62 having a diameter which is greater than the diameter of the body portion 61 of the valve stem 32 and smaller than the diameter portion 58 of the valve stem.

Under the urging of spring 38, the central opening 62 of the retainer 54 is pressed into abutting engagement with the shoulder 60. The shoulder 60 limits the axial travel of the retainer 54 toward the head end portion 34 of the valve stem 32. This limits the axial compression forces which are applied against the resilient washer 50 by the spring 38.

A three-legged spider 64 is positioned on a cylindrical end portion 66 of the valve stem 32 opposite the valve head 34. The relatively small diameter portion 66 of valve stem 32 passes through a central circular opening 68 in the spider 64. A radially outwardly extending tab 70 is located near the end of the reduced diameter portion 66 to retain the valve stem within the spider 64. The reduced diameter portion 66 forms an annular step 72 adjacent the main portion of the valve stem 32. This step 72 acts as an abutment surface against the spider 64 when spring 38 is compressed and thereby limits the axial movement of the valve stem 32. The manner in which the valve stem 32 and spider 64 cooperate is the same as is disclosed in U.S. Pat. No. 2,823,048.

In accordance with one of the features of the invention, the washer retainer 54 positively holds the washer 50 against axial movement relative to the valve stem when the washer is exposed to high fluid pressure. Thus, when the valve assembly 20 is in a partially open condition with high pressure fluid flowing past the washer 50, the washer retainer 54 prevents the washer from being dislodged by the fluid. Of course, the washer retainer 54 is effective to hold the washer 50 in place when the valve assembly 20 is in other operating conditions.

Figure 3:
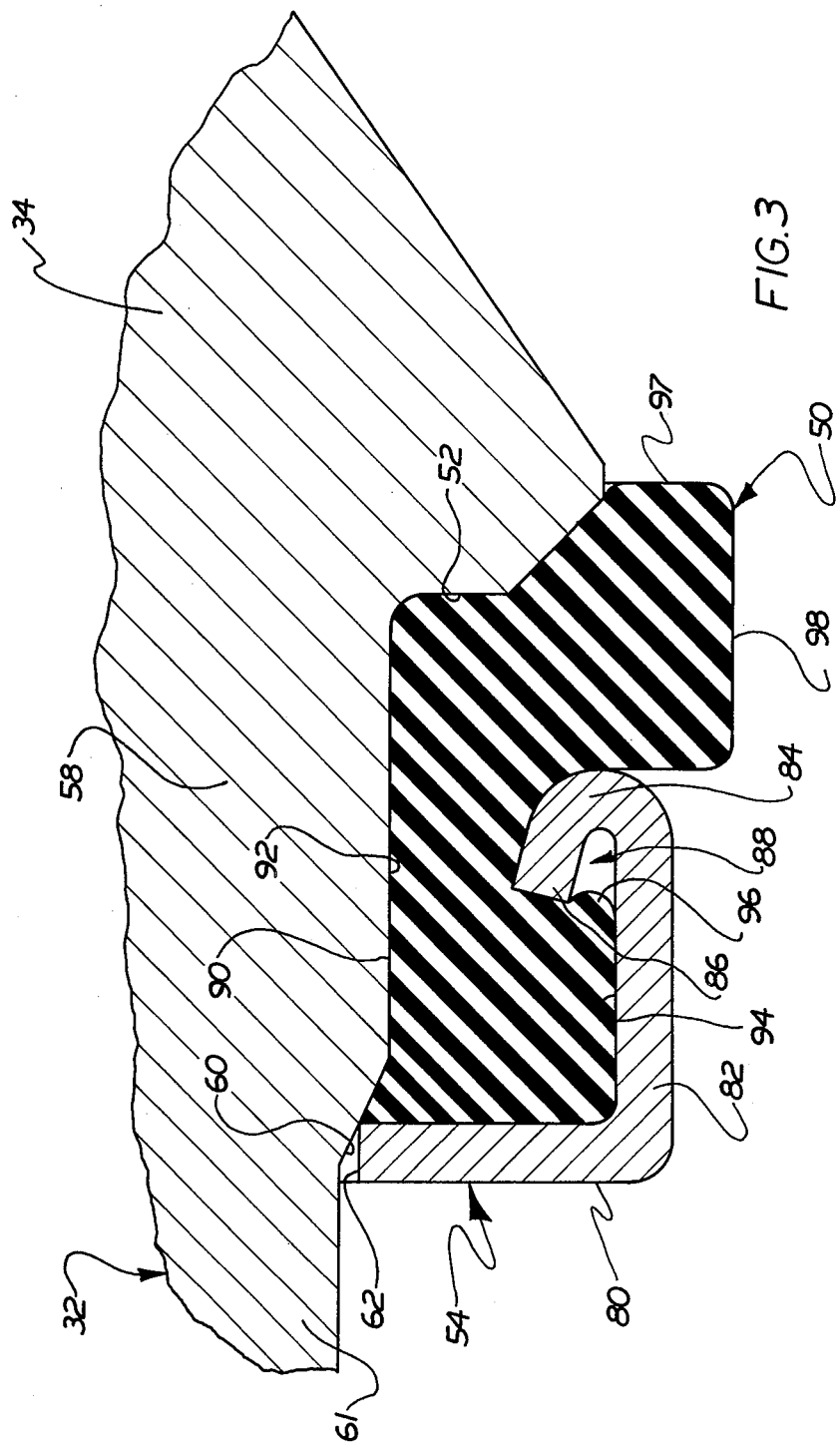
FIG. 3 is an enlarged fragmentary sectional view of the portion of the valve assembly appearing generally within the circle III of FIG. 2.

The cup-shaped washer retainer 54 has an annular base 80 (FIG. 3) through which the circular central opening 62 extends. A cylindrical side wall 82 extends axially outwardly from the outermost edge of the base 80. The outermost lip of the side wall 82 is formed into an inwardly extending hook 84 which engages the washer 50 to hold it in place in the retainer 54.

The annular hook 84 (FIG. 3) has a circular free end portion 86 which extends axially and radially inwardly from the cylindrical side wall 82. The free end portion 86 of the hook extends into the cup-shaped retainer 54 toward the base 80. The hook portion 84 defines an annular space 88 between the free end portion 86 and the inner surface of upstanding side wall 82.

In accordance with another feature of the invention, resilient washer 50 is expanded radially outwardly into engagement with the hook portion 84 to secure the washer in place in the retainer cup 54. To this end, the washer 50 has a circular central opening extending axially therethrough to define a inner side surface 90. The inner side surface 90 is disposed in abutting, pressure engagement with the cylindrical outer side surface 92 (FIG. 3) on the large diameter end portion 58 of valve stem 32. This pressure engagement between inner side surface 90 of washer 50 and outer side surface 92 of the valve stem 32 causes washer 50 to expand radially outwardly. The outer side surface of the expanded washer 50 is disposed in abutting engagement with the cylindrical inner surface 94 of the retainer cup side wall 82 at a location between the base 80 and free end portion 86 of the hook 84.

To provide a firm hooking action between the washer 50 and retainer cup 54, a portion 96 (FIG. 3) of resilient washer 50 extrudes under pressure into the annular space 88 located between upstanding side wall 82 and free end portion 86 of the hook 84. The hook 84 acts to positively hold the resilient washer 50 within the cup-shaped washer retainer 54. This prevents axial displacement of the washer when under fluid pressure is acting against the surfaces 97 and 98 of the washer.

To enable the washer 50 to be expanded radially outwardly into engagement with the hook portion 84 by the end portion 58 of the valve stem 32, the opening 90 in the washer is smaller than the end portion 58 of the valve stem when the washer is in an initial or unstressed condition. Thus, the resilient washer 50 (FIG. 5) has an inner side surface 100 which has a diameter a which is substantially smaller than the diameter b (FIG. 6) of enlarged end portion 58 of the valve stem 32. The diameter a is approximately equal to the diameter c (FIG. 6) of body portion 61 of the valve stem 32.

The outer surface portions of resilient washer 50 are adapted to engage the hook portion 84 of the retainer cup 54 and to sealingly engage the valve seat 36. Thus, the outer surface of the washer 50 includes an annular base surface 102 (FIG. 5) and a generally cylindrical side surface 104 extending axially therefrom. The side surface 104 has a diameter d which is less than the diameter e (FIG. 4) of the inside surface 94 of washer retainer 54 and greater than the diameter f of the washer retainer 54 measured at the radially inward extent of free end portion 86 of hook portion 84. The side surface 104 (FIG. 5) extends axially through a distance g which is somewhat less than a distance h (FIG. 4) between the free end portion 86 of hook 84 and the inner surface of the base 80 of washer retainer 54. An annular indentation 106 (FIG. 5) is formed along cylindrical side wall 54. A generally radially directed surface 108 (FIG. 5) extends outwardly from the annular indentation 106 to the cylindrical outer side surface 98 of the resilient washer 50 in the manner shown in FIG. 7.

Another feature of the present invention is that the valve assembly 20 can be assembled with a minimum of difficulty. When the valve assembly 20 is to be assembled, the resilient washer 50 is inserted into the cup-shaped retainer 54 in a generally unstressed or relaxed condition. When this is done, the hook portion 84 of the retainer 54 extends into indentation 106 to loosely hold the washer 50 in place.

The washer 50 and retainer 54 are then telescoped onto the valve stem. As this is done, the relatively small diameter end portion 66 of the valve stem 32 is inserted through the central opening of the washer 50 and the central opening of washer retainer 54. The valve stem 32 is then moved further through the washer 50 and retainer 54 to engage the body portion 61 of the valve stem with the inner side surface 100 of the washer. The surface 100 has approximately the same diameter a as the diameter c of the body 61 of the valve stem 32.

To expand the washer 50 into secure engagement with the retainer 54, the washer and retainer are pressed axially along the valve stem 32 in the direction of the arrow A (FIG. 7). When the axial movement causes inner side surface portion 100 of the washer 50 to engage the annular shoulder 60 of the valve stem, the resilient washer 50 begins to expand radially outwardly. This extrudes the base 102 and outer side surface 104 axially and radially into abutting and pressure engagement with the inner side surfaces of cup-shaped washer retainer 54.

Continuing its axial movement in the direction A, as more of the resilient washer 50 comes into contact with the large diameter end portion 58 of the stem, the resilient washer 50 is extruded into annular space 88 radially outwardly of the free end portion 86 of hook 84 of the washer retainer 54. Resilient washer 50 then moves into abutting engagement with the base 52 of the valve head 34. Axial compression forces continue to extrude the resilient washer 50 into positive engagement with the hook 84 of washer retainer 54. Axial compression of the washer is finally limited when a portion of the opening 62 in washer retainer 54 comes into abutting engagement with annular shoulder 60. With the installation of a spring 38 and spider 64 in a known manner, the valve assembly is completed and the washer and washer retainer are held against axial movement.

The valve and washer assembly of the present invention has been described in relation to a valve of a quick-disconnect coupling. It will be understood that the valve assembly in accordance with this invention may be used in other valve environments. Further, the detailed description has been directed to the valve assembly 20 in combination with socket coupling member 12. The features of the invention as set forth above may also find application in the valve assembly 19 of the plug coupling member 10.

From the foregoing it can be seen that the present invention provides a new and improved valve assembly 20 which is easily assembled. The valve 20 is advantageously used in a quick-disconnect coupling and includes a resilient washer 50 which sealingly engages a valve seat 36. The washer 50 is disposed in a retainer 54 having a hooked free end portion 86 which engages the washer 50 to positively retain it against axial movement.

When the valve 20 is to be assembled, the resilient washer 50 is placed in the retainer 54. The washer 50 and the retainer 54 are then moved into telescopic engagement with a valve stem 32. As the washer 50 and the retainer 54 are telescoped onto the valve stem 32, a portion of the valve stem 58 expands the washer radially outward into engagement with the hooked free end portion 86 of the retainer 54. In order to prevent application of excessive compression forces against the washer 50, the retainer 54 abuttingly engages a shoulder 60 on the valve stem 32 to limit movement of the retainer 54 and the washer 50 toward the head end portion 34 of the valve stem 32 against which the washer 50 is compressed.

While the invention has been described in the more limited aspects of a preferred embodiment thereof, other embodiments have been suggested and still others will occur to those skilled in the art upon a reading and understanding of the foregoing specification. It is intended that all such embodiments be included within the scope of the invention as limited only by the appended claims.

Having described one specific preferred embodiment of our invention, we claim:

1. A valve assembly comprising a valve stem, washer means disposed on said valve stem for engaging a valve seat, said washer means including a washer which has inner and outer side surfaces, circular retainer means for holding said washer against movement relative to said valve stem, said retainer means including a side section having opposite axial end portions and a hook portion at a first one of said axial end portions, said hook portion extending radially inwardly toward a central axis of said retainer means and axially inwardly toward a second one of said axial end portions, said hook portion having a free end which is spaced apart from said side section and is disposed at a location between said axial end portions, said washer being at least partially disposed between the free end of said hook portion and said side section, said valve stem including means for applying a force against the inner side surface of said washer to press said washer radially outwardly into the space between the free end of said hook portion and said side section.

2. The valve assembly as set forth in claim 1 further including means for axially compressing said washer on said valve stem.

3. The valve assembly as set forth in claim 2 further including means for limiting axial compression of said washer means on said valve stem.

4. The valve assembly as set forth in claim 3 in which said means for limiting axial compression comprises a shoulder on said valve stem and said retainer means includes means for cooperating with said shoulder to limit axial compression of said washer means.

5. The valve assembly as set forth in claim 4 wherein said means for axially compressing said washer includes means for holding said retainer means in abutment with said shoulder.

6. A valve assembly as set forth in claim 1 wherein said valve stem includes a first section having a first cross sectional area, a second section having a second cross sectional area which is greater than said first cross sectional area and a connector section extending between said first and second sections, said retainer means including a base section disposed at the second one of the axial end portions and extending radially inwardly from said side section, said base section including surface means defining an opening having an area which is greater than the first cross sectional area of said stem and less than the second cross sectional area of said stem, and spring means for urging said base section of said retainer means into abutting engagement with said connector section of said stem.

7. A valve assembly as set forth in claim 1 wherein said hook portion includes a curving section extending radially inwardly from the first one of said axial end portions and an end section extending from said curving section along said side section toward the second one of said axial end portions to the free end of said hook portion, said washer being partially disposed between said end section of said hook portion and said side section.

8. A valve assembly as set forth in claim 1 wherein said washer projects radially outwardly across said hook portion to a circular outer side surface having a diameter which is greater than the diameter of said circular retainer section.

9. A valve assembly comprising a valve stem, washer means for engaging a valve seat, said washer means including a washer which has inner and outer side surfaces, retainer means for holding said washer against axial movement relative to said valve stem, said retainer means including a hook portion, said valve stem including means for applying a force against the inner side surface of said washer means to press said outer side surface of said washer radially outwardly into engagement with said hook portion, means for axially compressing said washer on said valve stem, and means for limiting axial compression of said washer means on said valve stem, said means for limiting axial compression comprises a shoulder on said valve stem and said retainer means includes means for cooperating with said shoulder to limit axial compression of said washer means, said means for axially compressing said washer includes means for holding said retainer means in abutment with said shoulder, said means for holding said retainer means against said shoulder comprises a spring.

10. A valve assembly comprising washer means for sealing against a valve seat, a retainer having a circular bottom wall, an upstanding side wall extending from said bottom wall, and a radially inwardly extending hook portion located on said side wall, said hook portion having a free end portion disposed radially inwardly of said side wall and extending axially downwardly toward said bottom wall, said washer means comprising an annular washer having inner and outer side surfaces disposed within said retainer, an axially extending valve stem portion having an outer side surface and extending axially through said washer and retainer, a portion of said outer side surface of said valve stem being in abutting engagement with said inner side surface of said washer, at least a portion of said outer side surface of said washer being in abutting pressure engagement with an area of said side wall radially outwardly of said free end portion of said hook portion, a second portion of said outer side surface of said washer extending axially and radially outwardly of said side wall and said hook portion to engage said valve seat, first and second transverse annular surfaces on said outer side surface of said valve stem, a portion of said washer being in abutting engagement with said first transverse surface and a portion of said retainer being in abutting engagement with said second transverse surface, and means for holding said washer and said retainer in abutting engagement with said first and second transverse surfaces respectively.

11. The valve assembly as set forth in claim 10 wherein said means for holding said washer and retainer comprises a spring.

12. A method of assembling a valve assembly, said method comprising the steps of providing a circular washer formed of a resiliently expandable material, providing a circular washer retainer having a base, a circular side wall extending axially outwardly from the base, and a hook portion which extends radially inwardly from an inner side surface of the sidewall and extends axially inwardly to a free end which is spaced from the inner side surface and is disposed between and spaced from opposite axial ends of the retainer, expanding the washer radially outwardly of the free end of the hook portion and then expanding the washer axially outwardly into a space between the hook portion and the inner side surface of the sidewall, and thereafter holding the washer in a predetermined position relative to the retainer with the hook portion by engaging the washer with the free end of the hook portion at a location spaced from and disposed between opposite axial ends of the retainer and radially inwardly of the inner side surface of the retainer.

13. A method as set forth in claim 12 wherein said step of providing a washer includes the step of providing a washer having a central opening, said step of expanding the washer including the step of increasing the size of the central opening in the washer and simultaneously therewith moving material of the washer radially outwardly.

14. A method as set forth in claim 12 further including the step of providing a valve stem having a shank with a first cylindrical portion having a first diameter and a second cylindrical portion having a second diameter which is larger than the first diameter, said step of providing a washer including the step of providing a washer having an inner side surface defining a central opening extending through the washer, said step of expanding the washer including the steps of positioning the first cylindrical portion of the valve stem in the opening and thereafter effecting axial movement between the washer and the valve stem to position the second cylindrical portion of the valve stem in the opening, and forcing the material of the washer to move radially outwardly under the influence of forces applied against the inner side surface of the washer by the valve stem while performing said step of effecting axial movement between the washer and the valve stem.

* * * * *